United States Patent Office 3,019,261
Patented Jan. 30, 1962

3,019,261
N-FLUORINATEDALKYL-AMIDES OF ALKANOIC ACIDS AND PROCESS OF PREPARATION
Ivan Pascal, Wilmington, Del., assignor to E. I. du Pont de Nemours and Company, Wilmington, Del., a corporation of Delaware
No Drawing. Filed Mar. 12, 1959, Ser. No. 798,829
10 Claims. (Cl. 260—561)

This invention relates to a novel process for preparing polyfluoroalkylamines and their amides and salts and to N-methyl - 1H,1H,ωH - polyfluoroalkylamino compounds produced by such process.

Heretofore, amides and amines having a polyfluoroalkyl group have been made by involved, multi-step, expensive and hazardous processes, such as those disclosed by Carnahan in Patent 2,646,449 and by Husted et al. in Patent 2,691,043. It has also been proposed to react tetrafluoroethylene with an amine to produce directly an amine having a polyfluoroalkyl group but such reaction has not been practical nor the products particularly useful, the reaction frequently proceeding with explosive violence and frequently producing amines of only low molecular weight. The amines, produced by the latter method, contain a $CF_2$ group directly attached to nitrogen whereby they fail to form stable acid salts in aqueous solution, the salts being readily split by water and being stable only in anhydrous solvents.

It is an object of this invention to provide a direct, single step, low cost process for making N-methyl substituted polyfluoroalkyl formamides and acetamides. Another object is to provide a process for producing novel N-methylpolyfluoroalkylamines and valuable derivatives thereof. A further object is to provide novel N-methyl-1H,1H,ωH-polyfluoroalkylamines and the formamides and acetamides thereof. Other objects are to provide new compositions of matter and to advance the art. Still other objects will appear hereinafter.

The above and other objects may be accomplished in accordance with this invention which comprises the step of reacting tetrafluoroethylene with at least 0.1 part by weight of a member of the group consisting of N,N-dimethylformamide and N,N-dimethylacetamide at a temperature of from about 75° C. to about 200° C. in the presence of a free radical generating agent, whereby there are produced the novel N-methyl-1H,1H,ωH-polyfluoroalkyl acetamides and formamides of this invention. This invention also comprises the combination with the aforesaid step of a second step of hydrolyzing the aforesaid resulting amides by heating them with an aqueous solution of a strong acid at a temperature of from about 50° C. to about 130° C., whereby there are obtained the salts of the novel N-methyl-1H,1H,ωH-polyfluoroalkylamines of this invention, which salts can be converted to the free amino compounds by neutralizing the resulting solution of the amine salts with a strong base such as ammonia, alkali metal hydroxide, or the like.

The N-methyl-1H,1H,ωH-polyfluoroalkyl formamides and acetamides, obtained in the first step of the process, have the formula

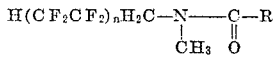

wherein $n$ is an integer of 1–6 and R represents hydrogen or methyl. Such amides may also be obtained from the amines by conventional processes. These amides are useful as dielectrics and as intermediates, particularly as intermediates for producing the valuable novel amines of this invention and their salts and other derivatives. Such amides are resistant to hydrolysis under alkaline conditions, but are readily hydrolyzed in aqueous solutions of strong acids to form the corresponding amines and salts of amines. In this respect, the amides of this invention are quite different from the corresponding amides of the primary amines disclosed by Husted et al. in Patent 2,743,297.

The lower molecular weight N-methyl-1H,1H,ωH-polyfluoroalkylamines of this invention are soluble in water and aqueous solutions of acids and bases and are quite stable in such solutions, e.g. they do not hydrolyze in water to form amides and are not split by water. The higher molecular weight amines of this invention likewise are soluble and stable in aqueous acid solutions. The amines of this invention form acid salts which are soluble and stable in water and aqueous solutions of acids. Such amines also form stable water-soluble quaternary ammonium compounds. The amines of this invention are more basic and reactive than corresponding primary amines, which is a distinct advantage for the synthesis of quaternary ammonium salts. They differ from the corresponding tertiary amines in being reactive with isocyanates to form thiourea compounds.

The N-methyl-1H,1H,ωH-polyfluoroalkylamines of this invention and their salts are useful as surface active agents and as intermediates for the production of thioureas and other valuable compounds. They are particularly useful for making valuable quaternary ammonium salts which are prepared by reacting the salt of the amine with a suitable alkylating agent. The resulting quaternary ammonium salts, particularly those made from methyl chloride and methyl iodide, are particularly useful as dispersants in the emulsion polymerization of such fluorine containing polymerizable materials as vinyl fluoride, tetrafluoroethylene, hexafluoropropene, and the like. They may also be used as leveling agents in waxes.

The process of this invention is simple and direct. It comprises a single step for making amides and a combination of steps for making amines and their salts. The single step or the first of the combination of steps involves placing tetrafluoroethylene and N,N-dimethylformamide or N,N-dimethylacetamide together with a free radical generating agent (or initiator) into a pressure reaction vessel in the absence of air, and heating the mixture to the desired temperature while mechanically shaking the reaction vessel or otherwise agitating the mixture. The temperature at which the reaction is run may be varied over a wide range, depending chiefly upon the decomposition temperature of the free radical generating agent. Suitable temperatures are in the range of from about 75° C. to about 200° C., preferably from about 120° C. to about 160° C. Preferably, the reaction is carried out under a pressure of from 1 to 200 atmospheres, although the reaction may be carried out under subatmospheric pressures.

The process may be operated continuously or intermittently. It may be conducted in an autoclave or similar pressure vessel or continuously in either the vapor phase or the liquid phase by mixing the reactants and passing the mixture through a hot reaction vessel. The reaction vessel may be made of any material which is capable of withstanding the temperatures and pressures involved, such as stainless steel, iron, silver, or other well-known metals and alloys.

The dimethylformamide or dimethylacetamide usually will be employed in the proportion of about 0.1 to about 20 parts by weight to each part of the tetrafluoroethylene, preferably from about 0.1 to 10 parts. N,N-dimethylalkanoic acid amides of the higher alkanoic acids are less efficient for the purpose of this invention and tend to cause side reactions and reduce the yield of the desired products.

The free radical generating agents which may be used in this invention are a well-known group of compounds which are known to be useful in related reactions. They include organic and inorganic peroxygen compounds and azonitriles. Representative peroxide type free radical generating agents are acetyl peroxide, benzoyl peroxide, tert.-butyl-peroxide, tert.-butyl-hydroperoxide, trifluoroacetyl hydroperoxide, hydrogen peroxide, oxygen, ozone and ammonium persulfate. Representative azonitriles are 2,2′-azobis(2-methylpropionitrile) and 1,1-azodicyclohexanecarbonitrile. Combinations of two or more of said free radical generating agents may be used. The selection of the free radical generating agent largely determines the temperature at which the reaction should be run. A temperature that will provide a half-life to the free radical generating agent of about 4 hours is generally desirable. The amount of the free radical generating agent may vary within relatively wide limits. Generally, the free radical generating agent will be used in a proportion of from about 0.1% to about 10% by weight based on the weight of the dimethyl formamide or dimethyl acetamide.

The reaction may be run in solution in an inert solvent or mixture of solvents. By an inert solvent is meant one which does not react with tetrafluoroethylene or which reacts therewith much less readily than do dimethyl formamide or dimethyl acetamide. When the dimethylformamide and dimethylacetamide is used in excess of that required to form the N-methyl-1H,1H,ωH-polyfluoroalkyl amide, such excess may be considered to be an inert solvent or reaction medium. The solvent should be liquid at the temperature and pressure employed in the reaction. The concentration of the amides in the solvent may range from about 5% to about 95% by weight. The use of a solvent in this process permits altering the course of the reaction and the molecular weight of the polyfluoroalkyl portion of the products. In general, other conditions remaining the same, the higher the dilution of the amides in the solution, the higher the molecular weight of the products. Usually, glacial acetic acid will be preferred. Other suitable solvents include fluoroalkanes such as perfluorohexane, fluorocycloalkanes such as perfluorocyclohexane, tetrafluorodichloroethane ($CF_2ClCF_2Cl$), tert.-butanol, nitromethane, acetonitrile, and water.

The hydrolysis of the N-methyl-1H,1H,ωH-polyfluoroalkyl formamides and acetamides may be effected in aqueous solution of strong mineral acids such as sulfuric acid, phosphoric acid, hydrochloric acid and hydrobromic acid or with strong organic acids such as trichloroacetic acid and trifluoroacetic acid. Dilute or concentrated aqueous solutions of the acid may be employed. Usually, it will be preferred to employ acid solutions in which the acid is in a concentration of from about 10% to about 35% by weight. The amount of the acid solution employed will be at least that which provides the amount of water required for the hydrolysis reaction and slightly more than the stoichiometric amount of acid required to form a salt with the amine. Large excessive amounts of acid solution can be used, but the amount usually will be dictated by practical, economical, and like considerations, such as the handling and heating of large volumes of liquid, the recovery of the amine or its salt from the aqueous solution, and the desired concentration of the amine or its salt in the aqueous solution, particularly where such solution is to be used in other operations such as in the preparation of quaternary ammonium compounds or thioureas, and as a dispersing medium in emulsion polymerizations and the like. Usually, the acid solution will be used in a proportion of from about 15 to about 25 parts by weight for each part of the amide to be hydrolyzed. The time needed to complete the hydrolysis will depend in part upon the acid concentration; being longer at low acid concentrations and shorter at higher acid concentrations.

Selective solvents may be used with the acid solution to change the solubility characteristics of the products. For example, with acetone or butanol present in the proper concentration in the acid solution, the acid salt of the amine will be precipitated as it is formed.

The hydrolysis may be carried out at temperatures of from about 50° C. to about 130° C. without affecting the nature and yield of the products. At room temperature the reaction is undesirably slow. Usually it is preferred to carry out the hydrolysis under reflux, that is, at the reflux temperature of the solution or mixture. High molecular weight acid amides may require up to 8 hours for the hydrolysis, owing to their low solubility in the aqueous acid solutions, but their hydrolysis time may be decreased by including a water-miscible solvent, such as dioxane, acetone and ethanol, to increase the solubility of the amide. Water-soluble and acid-soluble amides usually can be hydrolyzed in from about 10 to 60 minutes at 100–130° C. Longer times than necessary may be used to ensure complete hydrolysis without serious effects on the products.

As a result of the hydrolysis, the N-methyl-1H,1H,ωH-polyfluoroalkylamines are obtained as their salts in the aqueous solution. They may be converted to the free amines by neutralization with a suitable strong base such as ammonia or the alkali metal hydroxides. The free amines of low molecular weight are soluble in water and in the basic aqueous solutions and are difficult to separate from the solutions because they form azeotropes with water. Accordingly, it is generally preferred to employ them as the free amine or as the acid salt in the aqueous solutions. Also, for this reason, the amines have been identified as their more easily separated salts and thioureas in the examples presented hereinafter.

When it is desired to isolate the free amines, the aqueous acid solutions produced by the hydrolysis will be made alkaline by the addition of solid alkali metal hydroxide. The amines of low molecular weight ($n$ is 1, 2 or 3) may be extracted from the alkaline solution with a volatile organic solvent, such as ethyl ether, or the solution can be distilled by direct or steam distillation to provide a more concentrated aqueous solution of the amines and the amines extracted from such concentrated solution by the volatile solvent.

The higher molecular weight amines ($n$ is at least 4) are less soluble in the alkaline solutions, the solubility decreasing with increase in molecular weight, and frequently will separate, partially or substantially completely, from the alkaline solution. The separated amines can be removed from the solution and dried with solid alkali metal hydroxide or other drying agent. The amines in the remaining solutions can then be extracted with a volatile solvent, with or without preliminary concentration by distillation.

The volatile organic solvent, e.g. ether, can be removed from the extracts and the amines thereof combined with any separated amines, dried, and fractionated under atmospheric or reduced pressure to yield the pure amines.

In order to more clearly illustrate this invention, preferred modes for carrying it into effect and advantageous results obtained thereby, the following examples are given in which the proportions employed are by weight except where specifically indicated otherwise:

EXAMPLE 1

*Reaction of tetrafluoroethylene with N,N-dimethylacetamide*

One hundred parts by weight of N,N-dimethylacetamide and 1.6 parts of tert.-butyl peroxide were placed in a silver-lined shaker tube. The tube and its contents were then placed in an acetone/solid carbon dioxide bath and repeatedly evacuated and flushed with dry nitrogen to remove oxygen. The cold, evacuated, oxygen-free tube was next placed in the shaker and connected to a line supplying tetrafluoroethylene. Forty parts of tetrafluoroethylene were admitted to the tube, shaking was begun, and the tube was slowly heated to 130° C. The heating and shaking were continued until the pressure within the tube ceased to drop. About 40% of the tetrafluoroethylene reacted. The contents of the tube were then fractionated by distilling on a spinning band column to give, after removal of the unreacted starting material, the following fractions of N-methyl - 1H,1H,ωH - polyfluoroalkylacetamide,

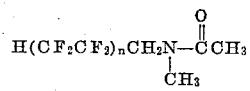

| Fraction | n value | Boiling Range, °C./mm. press. | Yield, Percent of product | Analysis | |
|---|---|---|---|---|---|
| | | | | Found | Calc'd |
| A | 1 | 73.5–94/7.7 | 36 | C, 36.3<br>H, 4.3<br>F, 44.7 | 38.5<br>4.9<br>40.6 |
| B | 2 | 103–112/6.5 | 31 | C, 32.3<br>H, 3.0<br>F, 52.8 | 33.5<br>3.2<br>52.9 |
| C | >2 (mainly 3) | >112/6.5 | 27 | | |

*Hydrolysis of N-methyl-1H,1H,ωH-polyfluoroalkylacetamide*

Six parts by weight of the above A fraction was mixed with 118 parts of a 25% water solution of sulfuric acid and heated under reflux for four hours. After cooling, the acidic solution was neutralized with solid potassium hydroxide to a pH of 8 to 9 and distilled. The distillate was a basic solution. To identify the basic product, one volume of the aqueous distillate was mixed with one volume of phenylisothiocyanate, and the mixture was heated on a steam bath. A solid separated which, when recrystallized from an ethanol solution, melted at 90° C. The infrared spectrum and chemical analysis of the crystalline product were in agreement with those for 1-methyl-3-phenyl-3-(2,2,3,3-tetrafluoropropyl)-2-thiourea.

*Analysis.*—Calculated for $C_{11}H_{12}N_2SF_4$: C, 47.2; H, 4.3; S, 11.5. Found: C, 46.7; H, 4.5; S, 11.6. The basic product is, therefore, N-methyl-2,2,3,3-tetrafluoropropylamine.

Another portion of the aqueous amine was evaporated to dryness in the presence of hydrochloric acid. When recrystallized from 2-butanol, the product melted at 164–165° C. and had a chlorine content of 19.5%. The calculated chlorine content of $$HCF_2CF_2CH_2\underset{\underset{HCl}{|}}{\overset{\overset{H}{|}}{N}}-CH_3$$

is 19.5%.

The free amine has the following analysis and properties:

| | Percent C | Percent H | Percent N | Percent F |
|---|---|---|---|---|
| Calculated | 33.1 | 4.83 | 9.65 | 52.4 |
| Found | 32.9 | 5.0 | 9.6 | 51.3, 51.5 |

Boiling point: 89° to 90° C. at 760 mm. pressure.
Refractive index: $n_D^{20}$ 1.3335.

EXAMPLE 2

Reactions were carried out as in Example 1 using N,N-dimethylformamide in place of N,N-dimethylacetamide and taken to tetrafluoroethylene conversions of 24% to 100%. A composite of the reaction products provided the following fractions of

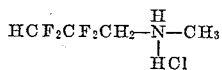

after removal of the unreacted starting material.

| Fraction | n value | Boiling Range, °C./mm. press. | Yield, percent of Product | Analysis | |
|---|---|---|---|---|---|
| | | | | Found | Calc'd |
| A | 1 | 95.5–103/20 | 26 | C, 31.3<br>H, 4.1<br>F, 45.5 | 34.7<br>4.1<br>44.0 |
| B | 2 | 120–128/20 | 25 | C, 30.3<br>H, 2.8<br>F, 56.0 | 30.8<br>2.6<br>55.3 |
| C | >2 | 128–>140/20 | 18 | | |
| Residue | | | 14 | | |

A portion of fraction A (5.5 parts by weight) was heated under reflux with 118 parts of 25% aqueous sulfuric acid solution for six hours. The cold reaction mixture was neutralized to pH 9 with concentrated potassium hydroxide solution, and the resulting solution was distilled. A portion of the basic distillate was then heated on a steam bath with an equal volume of phenyl isothiocyanate to give a solid thiourea. When crystallized from aqueous ethanol solution, the product melted at 90 to 90.5° C. and did not depress the melting point of the thiourea obtained from the hydrolysis product of the amide obtained from the reaction of tetrafluoroethylene and N,N-dimethylacetamide in Example 1. Both thioureas are, therefore, identical and were derived from the same amine, viz N-methyl-2,2,3,3-tetrafluoropropylamine.

EXAMPLE 3

A mixture of 40 parts of N,N-dimethylformamide, 105 parts of glacial acetic acid, 2 parts of tert.-butyl peroxide, and 50 parts of tetrafluoroethylene was placed in a silver-lined shaker tube and heated for 4.5 hours at 130° C. The gage pressure dropped about 200 p.s.i. The reaction mass was then distilled at 20 mm. mercury pressure. The solid residue amounted to 89 parts; no distillate was obtained with a boiling point greater than 66° C. at 20 mm. pressure. The lowest molecular weight product, i.e.

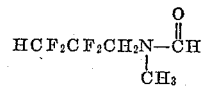

has a boiling point of more than 90° C. at 20 mm. pressure. Therefore the product has a higher molecular weight than the 1:1 addition product; chlorine analysis of a subsequent quaternary ammonium derivative indicates that the product contains between five and six tetrafluoroethylene units, i.e. the value of $n$ is between 5 and 6.

The solid amides, obtained from the above reaction, were mixed with a large excess of about 15% hydrochloric acid solution and heated under reflux for about 20 hours. The resulting solution was evaporated to dryness under reduced pressure to yield a solid amine hydrochloride. The amine hydrochloride (290 parts), anhydrous potassium carbonate (175 parts), and methanol (1200 parts by weight) were placed in a stainless steel autoclave. Methyl chloride (150 parts) was added and the mixture heated with agitation at 100° C. for 48 hours. A pressure drop of 45 p.s.i. was observed. The solid product was washed with water, filtered, and dried. It has a melting point higher than 220° C. and a chlorine content of 5.23%. This corresponds to a molecular weight of 678 for the quaternary ammonium chloride having the formula $H(CF_2CF_2)_nCH_2N(CH_3)_3Cl$ where $n$ has an average value of 5.68.

EXAMPLE 4

The solid amine hydrochloride (67 parts), isolated from the hydrolyzed reaction product from tetrafluoroethylene and N,N-dimethylformamide as in Example 3, was mixed with 72 parts of anhydrous potassium carbonate and 320 parts of methanol. Methyl iodide (72 parts) in 80 parts of methanol was added slowly to the mixture while the temperature of the solution was maintained at 40° C. The mixture was then heated under reflux for 18 hours while the temperature increased to 62° C. An additional 5 parts of methyl iodide was added and the reflux continued for eight hours. Evaporation of the solution gave a solid product that was extracted with water to remove the inorganic salts. The final dried product amounted to 51 parts and was the quaternary ammonium iodide having the formula $$H(CF_2CF_2)_nCH_2N(CH_3)_3I$$

where $n$ has an average value of 5.68. It had a melting point greater than 230° C. About a 0.1% solution in water had a surface tension of 42.4 dynes per cm. The water solution gave a precipitate with silver nitrate that was insoluble in aqueous ammonia solution indicating the presence of iodide ion.

It will be understood that the foregoing examples are given for illustrative purposes solely and that this invention is not limited to the specific embodiments set forth therein. On the other hand, it will be apparent to those skilled in the art that many variations and modifications can be made in the materials, proportions and conditions employed, within the limits disclosed in the general description, without departing from the spirit and scope of this invention.

From the preceding description, it is apparent that this invention provides a novel process for preparing polyfluoroalkylamino compounds which is simple and economical to operate and control. Also, this invention provides new polyfluoroalkylamines and their amides and salts which have novel beneficial properties and which are valuable and useful compounds. Accordingly, it is apparent that this invention constitutes a valuable advance in and contribution to the art.

The embodiments of the invention in which an exclusive property or privilege is claimed are defined as follows:

1. The process for preparing N-methyl-1H,1H,ωH-polyfluoroalkylamides which comprises reacting tetrafluoroethylene with from 0.1 to about 20 parts by weight of a member of the group consisting of N,N-dimethylformamide and N,N-dimethylacetamide at a temperature of from about 75° C. to about 200° C. in the presence of a free radical generating agent.

2. The process for preparing N-methyl-1H,1H,ωH-polyfluoroalkylamides which comprises reacting tetrafluoroethylene with from 0.1 to about 10 parts by weight of a member of the group consisting of N,N-dimethylformamide and N,N-dimethylacetamide at a temperature of from about 75° C. to about 200° C. in the presence of a free radical generating agent.

3. The process for preparing N-methyl-1H,1H,ωH-polyfluoroalkylamines which comprises reacting tetrafluoroethylene with from 0.1 to about 20 parts by weight of a member of the group consisting of N,N-dimethylformamide and N,N-dimethylacetamide at a temperature of from about 75° C. to about 200° C. in the presence of a free radical generating agent, and hydrolyzing the resulting amide by heating it with an aqueous solution of a strong acid at a temperature of from about 50° C. to about 130° C.

4. The process for preparing N-methyl-1H,1H,ωH-polyfluoroalkylamines which comprises reacting tetrafluoroethylene with from 0.1 to about 20 parts by weight of a member of the group consisting of N,N-dimethylformamide and N,N-dimethylacetamide at a temperature of from about 75° C. to about 200° C. in the presence of a free radical generating agent, and hydrolyzing the resulting amide by heating it with an aqueous solution of a strong acid under reflux.

5. The process for preparing N-methyl-1H,1H,ωH-polyfluoroalkylamines which comprises reacting tetrafluoroethylene with from 0.1 to about 20 parts by weight of a member of the group consisting of N,N-dimethylformamide and N,N-dimethylacetamide at a temperature of from about 75° C. to about 200° C. in the presence of a free radical generating agent, and hydrolyzing the resulting amide by heating it with an aqueous solution of a strong acid at a temperature of from about 50° C. to about 130° C., and neutralizing the resulting solution of the amine salt with an alkali metal hydroxide.

6. The process for preparing N-methyl-1H,1H,ωH-polyfluoroalkylamines which comprises reacting tetrafluoroethylene with from 0.1 to about 20 parts by weight of a member of the group consisting of N,N-dimethylformamide and N,N-dimethylacetamide at a temperature of from about 75° C. to about 200° C. in the presence of a free radical generating agent, and hydrolyzing the resulting amide by heating it with an aqueous solution of a strong acid under reflux, and neutralizing the resulting solution of the amine salt with an alkali metal hydroxide.

7. An N-methylpolyfluoroalkylacetamide of the formula

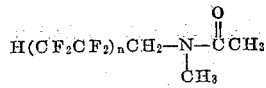

where $n$ represents an integer of from 1 to 6.

8. An N-methylpolyfluoroalkylacetamide of the formula

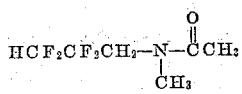

9. An N-methylpolyfluoroalkylformamide of the formula

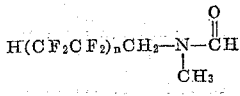

where $n$ represents an integer of from 1 to 6.

10. N-methylpolyfluoroalkylformamides of the formula

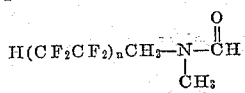

where $n$ represents an integer of from 5 to 6.

References Cited in the file of this patent

UNITED STATES PATENTS 2,646,449    Carnahan et al. ---------- July 21, 1953
2,691,043    Husted et al. ------------ Oct. 5, 1954
2,743,297    Husted et al. ----------- Apr. 24, 1956

OTHER REFERENCES

McBee et al.: "Industrial and Engineering Chemistry" vol. 39, page 417 (1947).

Degering: Outline of Organic Nitrogen Compounds (1950), pages 409–10.

Lovelace et al.: Aliphatic Fluorine Compounds, published by Rheinhold Publishing Corp. (New York), page 288, Method 1111 (1958).